(12) United States Patent
Chang et al.

(10) Patent No.: US 8,213,124 B2
(45) Date of Patent: Jul. 3, 2012

(54) FLEX CABLE ASSEMBLY FOR ROBUST RIGHT ANGLE INTERCONNECT

(75) Inventors: Jen-Yuan Chang, San Jose, CA (US);
Robert C. Reinhart, San Jose, CA (US);
Edgar D. Rothenberg, San Jose, CA (US); See C. Young, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1243 days.

(21) Appl. No.: 11/784,135

(22) Filed: Apr. 4, 2007

(65) Prior Publication Data

US 2008/0247094 A1 Oct. 9, 2008

(51) Int. Cl.
*G11B 5/54* (2006.01)

(52) U.S. Cl. .................................... 360/264.2

(58) Field of Classification Search ........... 360/265.7, 360/265.9, 245.8, 266.1, 264.2, 266.3, 246, 360/245.9
See application file for complete search history.

(56) References Cited

U.S. PATENT DOCUMENTS

| 5,422,764 | A | 6/1995 | McIlvanie |
| 5,668,684 | A | 9/1997 | Palmer et al. |
| 5,872,687 | A | 2/1999 | Arya et al. |
| 5,949,618 | A | 9/1999 | Arya et al. |
| 5,961,334 | A | 10/1999 | Inaba |
| 5,991,123 | A | 11/1999 | Casey |
| 6,212,046 | B1 | 4/2001 | Albrecht et al. |
| 6,399,889 | B1 | 6/2002 | Korkowski et al. |
| 6,634,086 | B2 | 10/2003 | Korkowski et al. |
| 6,724,578 | B2 | 4/2004 | Watanabe |
| 6,970,329 | B1 * | 11/2005 | Oveyssi et al. ............. 360/264.8 |
| 8,018,688 | B2 * | 9/2011 | Kamigama et al. ........... 360/266 |
| 2002/0105761 | A1 * | 8/2002 | Abe et al. .................. 360/264.2 |
| 2004/0257708 | A1 | 12/2004 | Erpelding |
| 2005/0011065 | A1 | 1/2005 | Zhang et al. |
| 2006/0012920 | A1 | 1/2006 | Kobae et al. |
| 2006/0012921 | A1 | 1/2006 | Kubota et al. |
| 2006/0118330 | A1 | 6/2006 | Ooyabu et al. |
| 2007/0279807 | A1 * | 12/2007 | Kobayashi et al. ........ 360/264.2 |
| 2008/0239574 | A1 * | 10/2008 | Chan et al. ................. 360/235.4 |

FOREIGN PATENT DOCUMENTS

| JP | 62104474 | 7/1987 |
| JP | 3117869 | 12/1991 |
| JP | 2005050470 | 2/2005 |

* cited by examiner

*Primary Examiner* — Allen Cao

(57) ABSTRACT

A hard disk drive flex cable assembly, for conveying data between a connector to a host system and a head stack assembly, comprises a flex cable, which in part has a first end for coupling to the connector, and a second end for coupling to the head stack assembly; and a stiffener coupled to the second end, wherein the stiffener supports at least one termination pad of the second end on three sides of the termination pad.

12 Claims, 5 Drawing Sheets

FLEX CABLE ASSEMBLY FOR ROBUST RIGHT ANGLE INTERCONNECT

TECHNICAL FIELD

This invention relates generally to the field of direct access storage devices and in particular to the fabrication of a flex cable for a robust assembly process.

BACKGROUND ART

Direct access storage devices (DASD) have become part of every day life, and as such, expectations and demands continually increase for better performance at lower cost. To meet these demands, the mechano-electrical assembly in a DASD device, specifically the Hard Disk Drive (HDD) has evolved to meet these demands.

An HDD is comprised of many complex parts and sub-assemblies. Each of these sub-assemblies has a manufacturing process that is required to produce a sub-assembly that functions as specified with a minimum amount of rejects and failures. Rejects and failures equate to added cost to the final HDD. Efforts are continually being made to improve manufacturing processes to increase yields and thereby keep manufacturing costs as low as possible.

SUMMARY OF THE INVENTION

Various embodiments of the present invention are described herein. A hard disk drive flex cable assembly, for conveying data between a connector to a host system and a head stack assembly, comprises a flex cable, which in part has a first end for coupling to the connector, and a second end for coupling to the head stack assembly; and a stiffener coupled to the second end, wherein the stiffener supports at least one termination pad of the second end on three sides of the termination pad.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a brief overview of a hard disk drive (HDD) and a flex cable assembly for a robust assembly process. The discussion will then focus on embodiments of the present invention by which a component of the flex cable enables a more robust assembly process of the flex cable assembly into a head stack assembly (HSA). The implementation of embodiments of the present invention will then be discussed.

Overview

Figure 1:
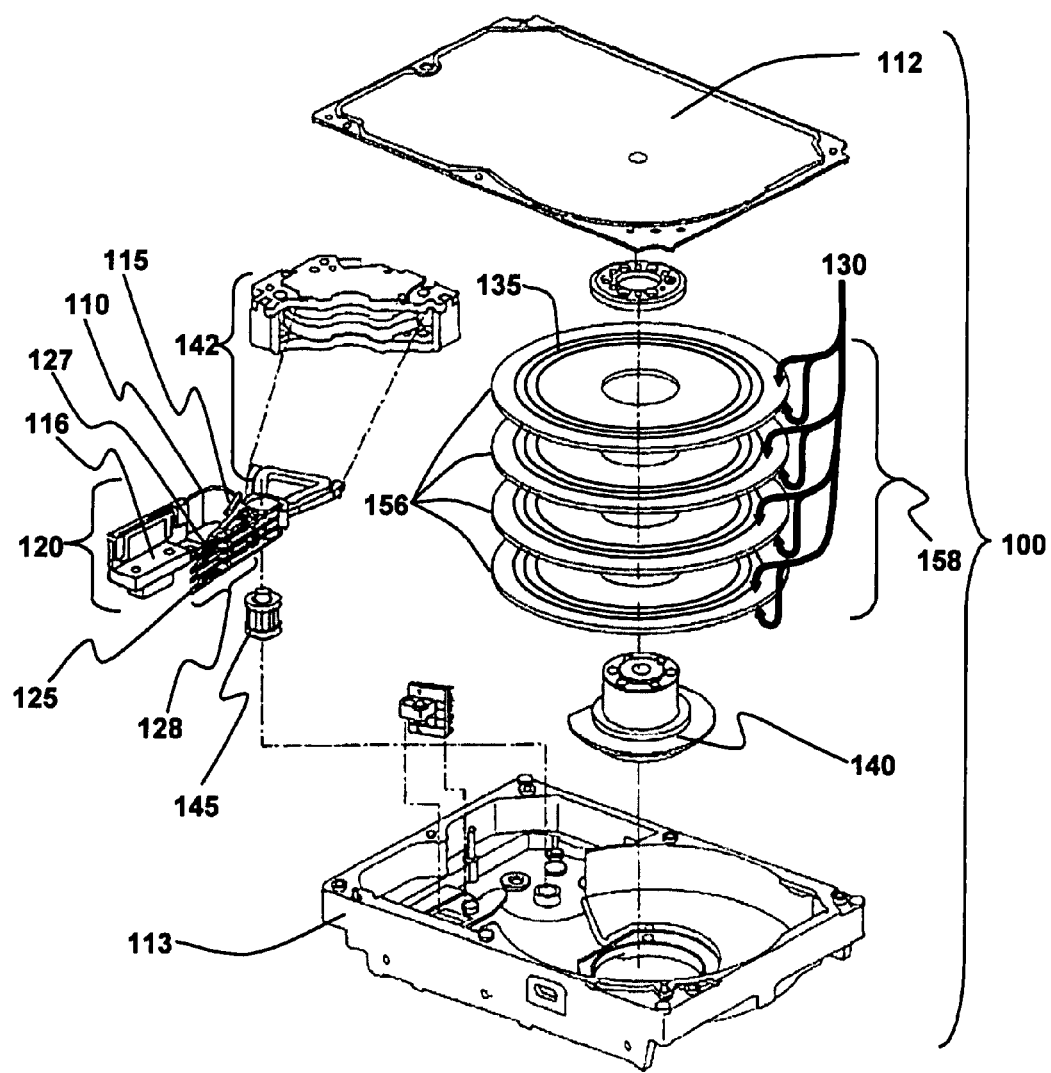
FIG. 1 is an isometric blow-apart of an HDD in accordance with one embodiment of the present invention.

With reference to FIG. 1, an isometric blow-apart of HDD 100 is presented in accordance with an embodiment of this invention. Base casting 113 provides coupling points for components and sub-assemblies such as disk stack 158, voice coil motor (VCM) 142, and HSA 120. Disk stack 158 is coupled to base casting 113 by means of motor-hub assembly 140. Motor-hub assembly 140 will have at least one disk 156 coupled to it such that disk 156 can rotate about an axis common to motor-hub assembly 140 and the center of disk 156. Disk 156 has at least one surface 130 upon which reside data tracks 135. HSA 120, sometimes referred to as an actuator assembly, comprises in part suspension 127, which suspends hard disk drive slider 125 next to disk surface 130, and connector 116, which conveys data between arm electronics (A/E) 115 and a host system wherein HDD 100 resides. Suspension 127 and hard disk drive slider 125 comprise in part head gimbal assembly (HGA) 128. Flex cable 110, which is part of HSA 120, conveys data between connector 116 and A/E 115.

HSA 120 is coupled pivotally to base casting 113 by means of pivot bearing 145, such that VCM 142 can move HGA 128 with slider 125 arcuately across disk surface 130. Upon assembly of HSA 120, disk stack 158, VCM 142, and other components with base casting 113, cover 112 is coupled to base casting 113 to enclose these components and sub-assemblies into HDD 100.

Physical Description

Figure 2:
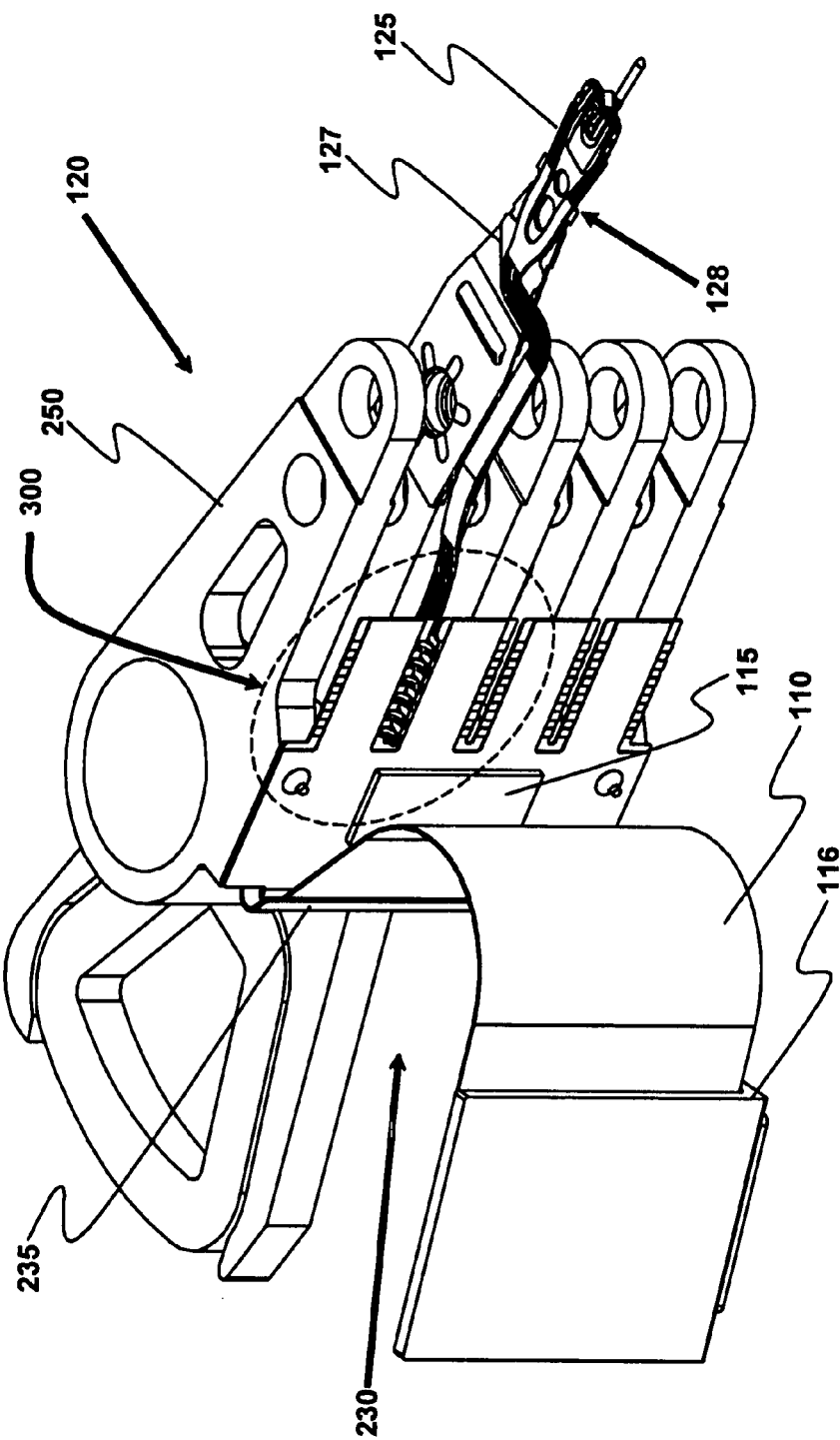
FIG. 2 is an isometric of a head stack assembly (HSA) in accordance with one embodiment of the present invention.

With reference to FIG. 2, an isometric of HSA 120 is presented in accordance with an embodiment of the present invention. For the sake of brevity and clarity, HSA 120 presents one head gimbal assembly (HGA) 128 which comprises in part slider 125 and suspension 127. Flex cable assembly 230 is comprised of flex cable 110, stiffener 235, arm electronics (A/E) 115, and connector 116. One end of flex cable 110 is coupled to connector 116. The other end of flex cable 110 is coupled to HSA 120 via stiffener 235. Flex cable 110 is adhesively coupled to stiffener 235. Flex cable 110 assumes the approximate shape to that which stiffener 235 is formed.

A/E 115 is coupled to flex cable 110. During normal operation, A/E 115 typically generates heat that needs to be dissipated. A/E 115 along with flex cable 110 are coupled to comb 250 of HSA 120 via stiffener 235. Stiffener 235 conducts heat from A/E 115 and into comb 250. Comb 250 dissipates the heat into the enclosure of the HDD, which is then conducted out into environment. To enhance thermal conduction from A/E 115, stiffener 235 is made from a thermally conductive material such as aluminum, steel, metal alloy or composite, or a thermally conductive plastic.

Stiffener 235 is typically coupled to flex cable 110 by means of an adhesive. Various groups of adhesives are known in the art that are suitable for bonding stiffener 235 to flex cable 110. Examples of these adhesive groups are epoxy, cyanoacrylate, and pressure sensitive adhesive.

Figure 3:
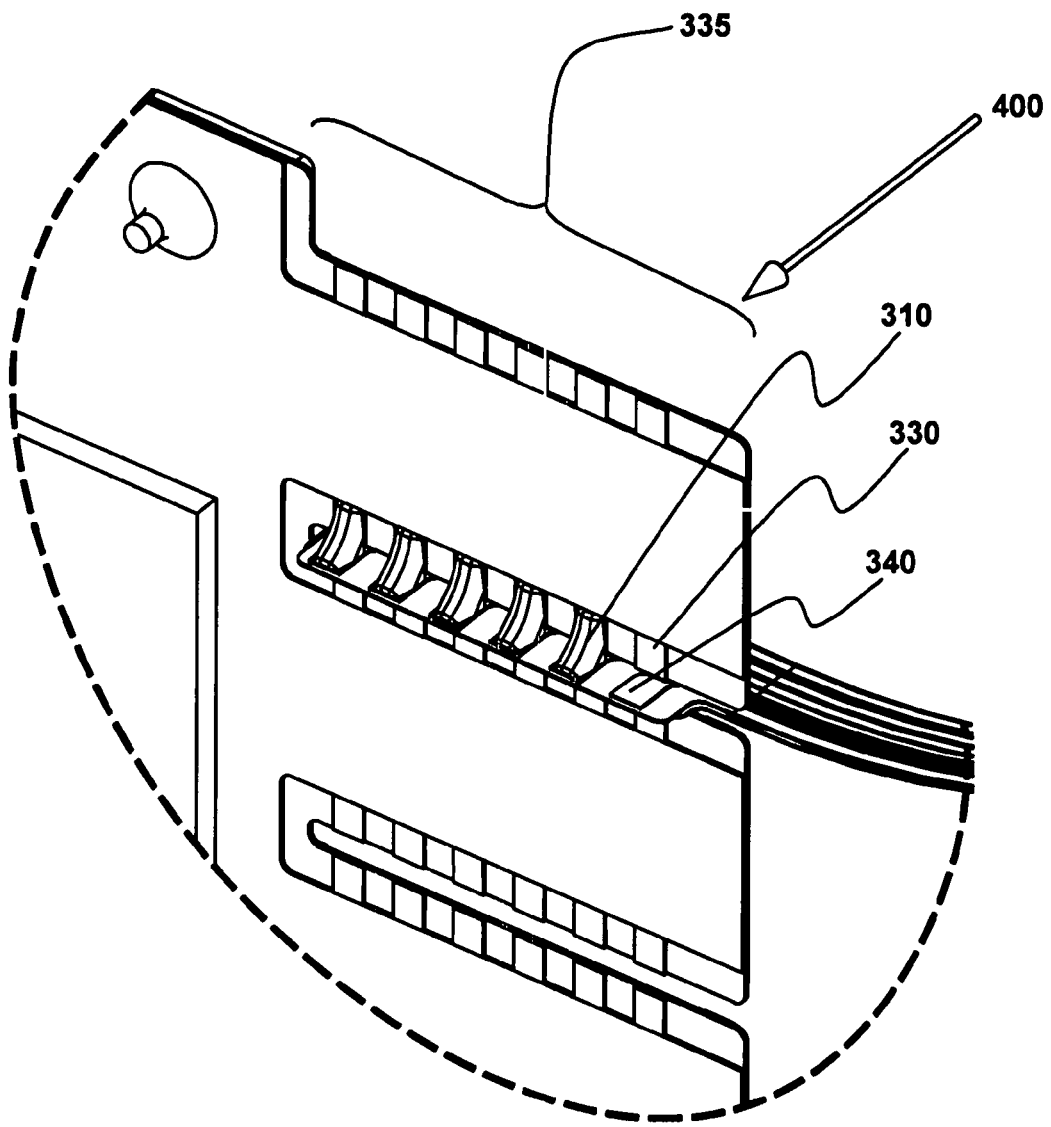
FIG. 3 is an isometric detail of a flex cable assembly for an HDD in accordance with one embodiment of the present invention.

With reference to FIG. 3, isometric detail 300 of flex cable assembly 230 for HDD 100 is presented in accordance with an embodiment of this invention. Flex cable assembly 230 is shown electrically coupled to HGA 128 via a termination method known in the art as a right-angle solder fillet joint 310. To enable the proper formation of right-angle solder fillet joint 310, sufficient alignment of flex cable termination pad 330 to suspension termination pad 340 is needed to allow solder to bridge any gap between flex cable termination pad 330 and suspension termination pad 340. For the sake of clarity and not as a representation of a normal assembly, one solder filet joint is not shown to expose a view of flex cable termination pad 330 and suspension termination pad 340.

Various techniques for forming right-angle solder fillet joint 310 are known in the art. An example of one technique comprises applying solder to suspension termination pad 340 and to flex cable termination pad 330, aligning these termination pads and heating the solder on these pads to form the desired solder fillet joint 310. Another example of a technique for forming right-angle solder fillet joint 310 is to align flex cable termination pad 330 with respect to suspension termination pad 340, place a solder ball in the corner formed by the termination pads, and heat the solder ball to form the desired solder fillet joint 310. It is obvious to one skilled in the art that numerous variations on these techniques for forming solder fillet joint 310 are available. For the sake of brevity and clarity, only two examples are presented. In all techniques, sufficient alignment of flex cable termination pad 330 with respect to suspension termination pad 340 is needed to allow solder to bridge any gap between flex cable termination pad 330 and suspension termination pad 340.

Alignment of flex cable termination pad 330 with respect to suspension termination pad 340 is influenced by several factors. One factor is the position of flex cable assembly 230 with respect to HGA 128. Another factor is the fabrication tolerances for fabricating suspension termination pad 340 and flex cable termination pad 330. Another factor is unwanted and uncontrolled deformation of flex cable 110 containing flex cable termination pad 330. Flex cable termination pad 330 is contained by a structure known as flex cable assembly finger 335. Finger 335 comprises flex cable 110, flex cable termination pad 330, and an end of stiffener 235.

Figure 4:
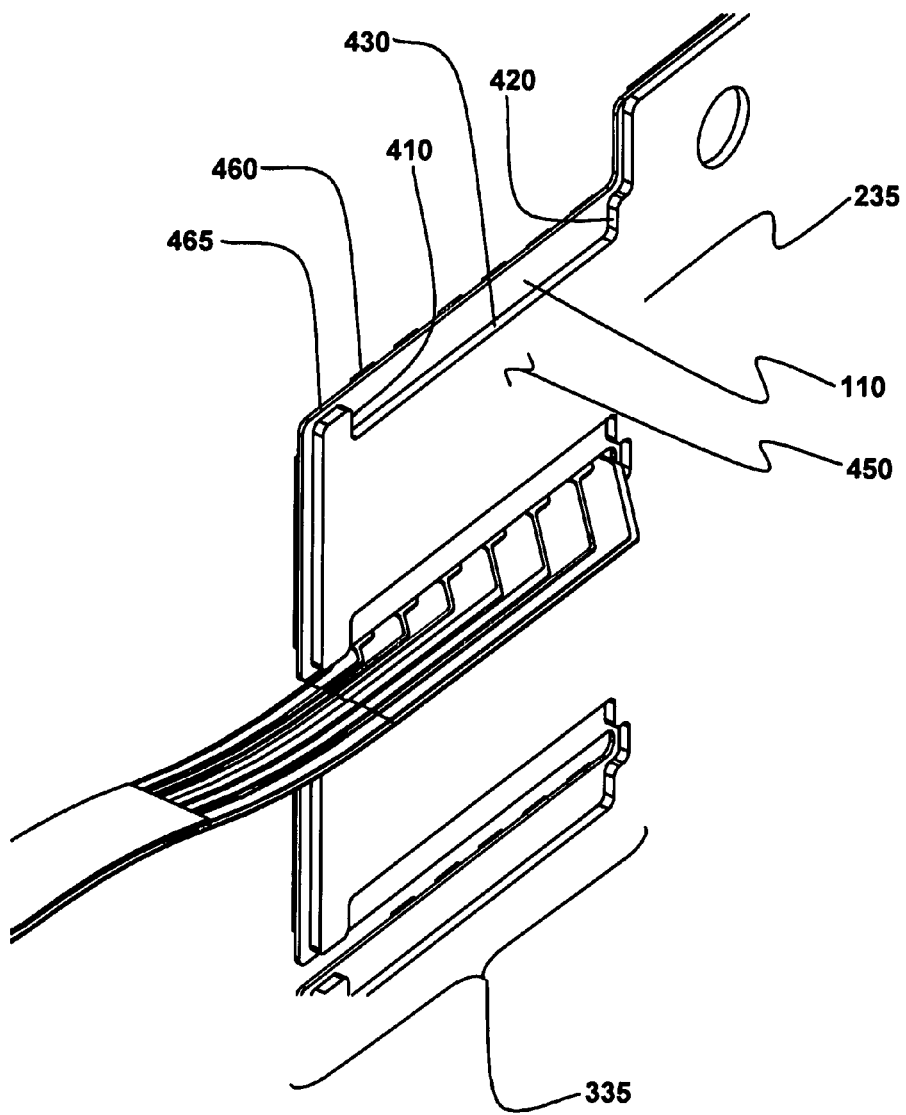
FIG. 4 is an isometric detail of a flex cable assembly finger in accordance with one embodiment of the present invention.

With reference to FIG. 4, isometric detail 400 of flex cable assembly finger 335 is presented in accordance with an embodiment of this invention. Detail 400 is a backside view of FIG. 3. For the sake of clarity, flex cable assembly 230 is shown detached from comb 250. Two sets of edges 410, 420, and 430 are machined into stiffener 235. Edge 410 and edge 420 are approximately parallel to each other and are approximately perpendicular to edge 430. The two sets of edges 410, 420, and 430 result in two notches that approximate an I-shape 450 in stiffener 235. Flex cable termination pad 330 is supported on three sides by edges 410, 420, and 430. In this manner the support provided by edges 410, 420, and 430 inhibit uncontrolled deformation of flex cable 110 in the location of finger 335.

Another factor that can influence the formation of solder fillet joint 310 is the distance that solder fillet 310 (FIG. 3) must bridge between flex cable termination pad 330 and suspension termination pad 340. To minimize the distance between flex cable termination pad 330 and suspension termination pad 340, flex cable 110 is patterned such that distal edge 460 of flex cable termination pad 330 is approximately collinear with edge 465 of flex cable 110. Patterning of flex cable 110 can be accomplished by several methods well known in the art, such as etching, punching, and laser trimming.

It can be appreciated by one of ordinary skill in the art that the formation of solder fillet joint 310 should be free of an extraneous conductor such as stiffener 235. To this end, edge 465 of flex cable 10 is parallel and non-collinear to edge 430 of stiffener 235.

So as to provide robustness to the process of aligning and electrically coupling flex cable assembly 230 to HGA 128, and thus providing robust assembly of HSA 120, it should be appreciated by one of ordinary skill in the art, that flex cable termination pad 330 should typically not deform or deflect in a manner that would be detrimental to the alignment between flex cable termination pad 330 and suspension termination pad 340. This robustness is provided by edges 410 and 420 which are approximately parallel and non-collinear to an edge of flex cable termination pad 330. Edges 410 and 420 in conjunction with edge 430 provide support and rigidity to flex cable termination pad 330, while distancing any extraneous conductor such as stiffener 235 from interfering with solder fillet joint 310 and the proper conveying of data from HGA 128 to A/E 115.

Operation

Figure 5:
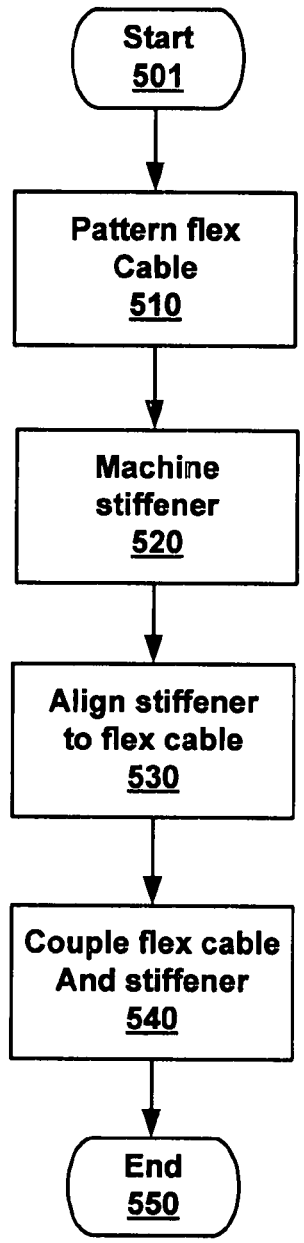
FIG. 5 is a flow chart illustrating steps of a fabrication process for a flex cable assembly for an HDD in accordance with one embodiment of the present invention.

FIG. 5 is a flow chart of a process 500 in which particular steps are performed in accordance with an embodiment of the present invention for fabricating a hard disk drive flex cable assembly for conveying data between a connector to a host system and a head stack assembly, such that the assembly process of a head stack assembly is robust. Although specific steps are disclosed in process 500, such steps are exemplary. That is, the embodiment(s) of the present invention is well suited to performing various other steps or variations of the steps recited in FIG. 5. Within the present embodiment, it should be appreciated that the steps of process 500 may be performed by software, by hardware, by an assembly mechanism, through human interaction, or by any combination of software, hardware, assembly mechanism, and human interaction.

Process 500 will be described with reference to elements shown in FIG. 1, 3 and 4.

In step 501 of process 500, a suitable flex cable substrate is introduced into process 500, in an embodiment of the present invention. A suitable substrate for a flex cable in a process such as process 500 is a lamination of copper or copper alloy laminated to a flexible carrier.

In step 510 of process 500, flex cable 110 is patterned in an embodiment of the present invention. Photolithographic processes, which are well known in the art, are typically used to pattern the flex cable. The patterning process in step 510 comprises, but is not limited to etching the copper or copper alloy to form a trace with at least one flex cable termination pad 330; applying a cover layer to the trace, leaving flex cable termination pad 330 exposed; coating the termination pad with a metal or metal alloy that is conducive to effecting a right-angle solder fillet joint; and patterning the perimeter for flex cable 110.

The patterning of the perimeter of flex cable 110 is performed by any one of the patterning process such as etching, punching or laser trimming, known to on skilled in the art. The patterning of the flex cable 110 is performed such that a first end can receive connector 116, and a second end can be coupled to HSA 120. Flex cable 110 is patterned such that distal edge 460 of flex cable termination pad 330 is approximately collinear with edge 465 of flex cable 110.

In step 520 of process 500, stiffener 235 is machined in an embodiment of the present invention. The machining of stiffener 235 is performed by any one of the patterning process such as etching, punching, laser trimming, or milling, known to on skilled in the art. The machining of stiffener 235 is effected such that an approximate I-shape 450 is formed in a perimeter at an end which may be coupled to HSA 120.

In step 530 of process 500, stiffener 235 is aligned to flex cable 110 in an embodiment of the present invention. The aligning of stiffener 235 to flex cable 110 is effected such that the axis of the approximate I-shape 450 of stiffener 235 is collinear with the axis of the corresponding end of flex cable 110, which may be coupled to HSA 120 via stiffener 235.

In step 540 of process 500, stiffener 235 and flex cable 110 are coupled in an embodiment of the present invention. Stiffener 235 is typically coupled to flex cable 110 by means of an adhesive. Various groups of adhesives are known in the art that are suitable for bonding stiffener 235 to flex cable 110. Examples of these adhesive groups are epoxy, cyanoacrylate, and pressure sensitive adhesive. Flex cable 110 assumes the approximate shape to that which stiffener 235 is formed. The shape of stiffener 235 may be formed before or after the coupling of flex cable 110 and stiffener 235.

In step 550 of process 500 the fabrication of a hard disk drive flex cable assembly for a robust head stack assembly is complete.

The present invention, in the various presented embodiments allow for the fabrication of a flex cable assembly that is robust in an assembly process for an HSA. One of ordinary skill in the art will appreciate that the components comprising the flex cable assembly are designed in concert to produce a flex cable assembly that is robust upon entering and proceeding through an assembly process for an HSA. Robustness of the flex cable assembly and the resulting robustness of the HSA process provide economic benefit.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A hard disk drive flex cable assembly for conveying data between a connector to a host system and a head stack assembly comprising:
   a flex cable comprising;
      a first end for coupling to said connector; and
      a second end for coupling to said head stack assembly at a right-angle; and
   a stiffener comprising a thermally conductive composite material, said stiffener coupled to said second end, wherein said stiffener supports at least one termination pad of said second end on three sides of said termination pad, said termination pad providing a right-angle electrical connection to said head stack assembly wherein a distal edge of said termination pad is approximately collinear with an edge of said flex cable.

2. The hard disk drive flex cable assembly of claim 1 wherein said flex cable is adhesively coupled to said stiffener.

3. The hard disk drive flex cable assembly of claim 1 wherein said stiffener comprises a forming means for said flex cable.

4. The hard disk drive flex cable assembly of claim 1 wherein said stiffener is coupled to arm electronics.

5. The hard disk drive flex cable assembly of claim 1 wherein a distal edge of said termination pad is parallel and non-collinear to an edge of said stiffener.

6. The hard disk drive flex cable assembly of claim 1 wherein an edge, which forms a corner with a distal edge of said termination pad, is approximately parallel and non-collinear to an edge of said stiffener.

7. A hard disk drive comprising:
   a base casting for providing coupling points for components and sub-assemblies of said hard disk drive;
   a motor-hub assembly to which at least one disk is coupled allowing rotation of said disk about an axis approximately perpendicular and centered to said disk, wherein said motor-hub assembly is coupled to said base casting;
   a head stack assembly comprising:
      at least one arm coupled to at least one head gimbal assembly;
      a pivot means coupled to said base casting allowing said head stack assembly to move said head gimbal assembly accurately across said disk; and
   a flex cable assembly for conveying data between a connector to a host system and a head stack assembly comprising:
      a flex cable comprising;
         a first end for coupling to said connector; and
         a second end for coupling to said head stack assembly at a right-angle; and
      a stiffener comprising a thermally conductive plastic material, said stiffener coupled to said second end, wherein said stiffener supports at least one termination pad of said second end on three sides of said termination pad, said termination pad providing a right-angle electrical connection to said head stack assembly, wherein a distal edge of said termination pad is parallel and non-collinear to an edge of said stiffener.

8. The hard disk drive of claim 7 wherein said flex cable is adhesively coupled to said stiffener.

9. The hard disk drive of claim 7 wherein said stiffener comprises a forming means for said flex cable.

10. The hard disk drive of claim 7 wherein said stiffener is coupled to arm electronics.

11. The hard disk drive of claim 7 wherein a distal edge of said termination pad is approximately collinear with an edge of said flex cable.

12. The hard disk drive of claim 6 wherein an edge, which forms a corner with a distal edge of said termination pad, is approximately parallel and non-collinear to an edge of said stiffener.

* * * * *

UNITED STATES PATENT AND TRADEMARK OFFICE
CERTIFICATE OF CORRECTION

PATENT NO. : 8,213,124 B2
APPLICATION NO. : 11/784135
DATED : July 3, 2012
INVENTOR(S) : Jen-Yuan Chang et al.

It is certified that error appears in the above-identified patent and that said Letters Patent is hereby corrected as shown below:

Column 6, Claim 12, Line 56: Delete, "claim 6"
Insert, --claim 7--

Signed and Sealed this
Nineteenth Day of March, 2013

Teresa Stanek Rea
*Acting Director of the United States Patent and Trademark Office*